United States Patent
Tamura

[11] Patent Number: 5,837,973
[45] Date of Patent: Nov. 17, 1998

[54] ASSEMBLY OF THERMOCOUPLE SENSOR FITTED TO IRON TIP

[75] Inventor: Toshiharu Tamura, Tomobe-machi, Japan

[73] Assignee: Japan Bonkote Company Limited, Mito, Japan

[21] Appl. No.: 505,816

[22] Filed: Jul. 21, 1995

[30] Foreign Application Priority Data

Feb. 15, 1995 [JP] Japan ................................ 7-051910

[51] Int. Cl.⁶ .............................. G01K 7/02; H05B 1/02; B23K 3/02; B23K 3/03
[52] U.S. Cl. ............................ 219/241; 219/229; 228/51
[58] Field of Search ................................ 219/233, 241, 219/240, 229; 228/8, 9, 51–55; 126/236; 374/179

[56] References Cited

U.S. PATENT DOCUMENTS

| | | | |
|---|---|---|---|
| 2,897,335 | 7/1959 | Finch | 219/237 |
| 3,530,930 | 9/1970 | Oldfield | 219/241 |
| 3,654,427 | 4/1972 | Schoenwald | 219/241 |
| 4,924,067 | 5/1990 | Wilhelmson | 219/241 |
| 5,062,564 | 11/1991 | Urban | 228/9 |
| 5,122,637 | 6/1992 | Bottorff et al. | 219/241 |
| 5,297,716 | 3/1994 | Smith et al. | 228/8 |
| 5,406,053 | 4/1995 | Masreliez | 219/241 |
| 5,412,178 | 5/1995 | Tamura | 219/241 |

FOREIGN PATENT DOCUMENTS

| | | |
|---|---|---|
| 0 337 065 | 10/1989 | European Pat. Off. . |
| 27 08 967 | 9/1978 | Germany . |
| 219701 | 3/1985 | Germany . |
| 56-54313 | 5/1981 | Japan . |
| 4-288966 | 10/1992 | Japan . |
| 7-40037 | 2/1995 | Japan . |
| 7713629 | 6/1979 | Netherlands . |
| 260032 | 12/1969 | U.S.S.R. . |
| 588216 | 5/1947 | United Kingdom ................ 219/241 |
| 1289816 | 9/1972 | United Kingdom ................ 219/241 |
| 1507033 | 4/1978 | United Kingdom . |
| 2148676 | 5/1985 | United Kingdom . |

*Primary Examiner*—John A. Jeffery
*Attorney, Agent, or Firm*—Wenderoth, Lind & Ponack

[57] ABSTRACT

A thermocouple sensor is fitted to an iron tip of an electric soldering iron provided with a temperature controller. The sensor can detect the temperature of the iron tip and supply it to the temperature controller, which then adjusts the temperature to a desired value. The thermocouple sensor is formed of a pair of non-covered sensor wires. A contact point part of the thermocouple sensor is secured to a nose of the iron tip. The wires are laid along the surface of the nose in the rearward direction and introduced into a hollow portion through a lead-in hole opened in the vicinity of the boundary between the nose and a columnar base of the iron tip. Then, the wires are inserted into and through a pair of guide holes, respectively, formed in a cylindrical insulating support of a heater. The distal ends of the wires are coupled to a socket, which is an end portion for receiving a signal representing the detected temperature of the iron tip to supply it to the temperature controller.

11 Claims, 6 Drawing Sheets

ASSEMBLY OF THERMOCOUPLE SENSOR FITTED TO IRON TIP

BACKGROUND OF THE INVENTION

1. Field of the Invention

The present invention relates to an assembly of a thermocouple sensor fitted to an iron tip of an electric soldering iron provided with a temperature controller, so that the sensor can detect the temperature of the iron tip and supply it to the temperature controller, which then adjusts the temperature to a desired value.

2. Description of the Related Art

In order to properly perform electric soldering of electric wiring, it is necessary, in particular, to precisely set and maintain the temperature of an iron tip of an electric soldering iron.

To achieve this, electric soldering irons have been conventionally provided with a temperature controller which is constructed to be capable of adjusting the temperature of the iron tip.

A conventional electric soldering iron 1 of this type is constructed as shown in FIG. 8, by way of example. A heat-radiating plate 4 is secured to the forward end of a grip 2 via a heat-radiating nut 3. An iron tip 5 is fit in the radiating plate 4 via a heater cover 6 and a cover nut 7. The heater cover 6 only covers the columnar base of the tip 5, while leaving the nose portion thereof uncovered. The cover nut 7 is screwed onto a male thread formed around the outer periphery of the forward end of the radiating plate 4, while holding the rear end of the heater cover 6.

As has been mentioned above, the iron tip 5 comprises the tapered nose and the columnar base extending from the rear end of the nose. The columnar base is formed hollow from the rear end to the portion adjacent to the boundary between the base and the nose. A heater 8 shown in FIG. 7 is disposed in the hollow portion. An insulating support 9 of the heater 8 is provided with a pair of guide holes passing from the forward end to the rearward end of the support 9. A ceramic element 12 having a contact point part 11, which is a heat-sensitive part of a thermocouple sensor 10, embedded in the element 12 is disposed at the forward end of the insulating support 9. A pair of sensor wires of the thermocouple sensor 10 are respectively inserted into and through the guide holes, and the distal ends of the wires are coupled to a socket, which is an end portion for receiving a signal representing the temperature of the iron tip, connected to the distal ends of signal lines extending from a temperature controller.

In the conventional electric soldering iron 1 constructed as described above, soldering is carried out by supplying power to the heater 8 which then generates heat and applies it to the iron tip 5. During this soldering operation, the following temperature control is performed. Since the contact point part 11, which is a heat-sensitive part of the thermocouple sensor 10, is securely fixed to the forward end of the heater 8 by being embedded in the ceramic element 12, the thermocouple sensor 10 naturally ends up detecting the temperature of the heater 8. The detected temperature is then converted by the temperature controller into a value representing the temperature of the iron tip 5, and the converted temperature is compared with a desired temperature (reference temperature) of the iron tip. If the converted temperature is lower than the reference temperature, the amount of power supplied to the heater 8 is increased, and vice versa, thus controlling the temperature of the iron tip 5.

Therefore, when controlling the temperature of the iron tip 5 of the conventional electric soldering iron 1 of this type, the temperature of the iron tip 5 is not directly detected, but the temperature of the heater 8, which is a heating means, is detected. Then, the temperature controller executes the following processing. From the detected temperature of the heater 8, the temperature of the iron tip 5 is inferred, and based on this inferred value, the amount of power supplied to the heater 8 is adjusted so as to control the temperature of the iron tip 5. Because the inferred value may not be the actual temperature of the iron tip, the tip may be disadvantageously regulated to an incorrect temperature.

In other words, when using the conventional electric soldering iron 1, the temperature of the iron tip 5 and that of the heater 8 maintain a constant relationship in which the temperature values approximate each other during the idling state, i.e., prior to use. It is thus possible to make adjustments to the temperature of the iron tip in a relatively correct manner. However, when the actual soldering operation is started, the iron tip 5 is cooled by solder or parts to be soldered, and a certain time lag occurs before the thus-lowered temperature of the iron tip can be reflected by the heater. Hence, during the actual soldering operation, the temperature of the iron tip 5, which has been converted from the temperature of the heater 8 based on a predetermined calculation formula, does not coincide with the actual temperature of the iron tip 5, thereby making it impossible to realize correct adjustments to the temperature of the iron tip 5.

More specifically, a temperature drop of the iron tip caused by contact with solder or parts to be soldered will not be immediately reflected by the temperature of the heater. Thus, only after the temperature of the iron tip 5 drops considerably, i.e., after a lapse of a comparatively long time in terms of the overall soldering operation, will the temperature of the heater 8 eventually drop. Only after the temperature drop is detected, is the control system eventually actuated to compensate for such temperature drop. As a consequence, with the above-described conventional electric soldering iron, a temperature drop of the iron tip cannot be correctly detected in real time, thereby causing a poor response by the control system operable to compensate for the temperature drop, resulting in unsatisfactory soldering.

In particular, for properly soldering electric parts which are increasing in better performance and becoming more highly integrated, without causing damage thereto, it is necessary to adjust the temperature of the iron tip of the electric soldering iron with high accuracy.

In order to solve the above-described problems, the applicant of this invention filed in the Japanese Patent Office an application for an electric soldering iron which is constructed in such a manner that the temperature of the iron tip can be correctly controlled with good response (Japanese Patent Application No. 5-203001, Japanese Patent Laid-Open No. 7-40037, hereinafter referred to as "the second conventional technique"). The applicant also filed an application in the United States Patent Office as a basis of a priority ensured by the Paris Convention for the Protection of Industrial Property, and obtained a United States patent (U.S. Pat. No. 5,412,178).

The electric soldering iron of the above-described second conventional technique will now be explained, in particular, referring to the Japanese patent application.

That is, the electric soldering iron, which is operable by heating an iron tip with a heater, makes adjustments to the temperature of the iron tip by the following process. The amount of power supplied to the heater is adjusted by control means, based on the detected temperature of the iron tip, thereby adjusting the temperature of the tip to a desired value.

The electric soldering iron is characterized in that a temperature sensor for detecting the temperature of the iron tip is attached to or near the forward end of the iron tip.

In this electric soldering iron, the temperature sensor may be formed of, for example, a thermocouple sensor, in which case, it is required that a pair of sensor wires constituting the thermocouple sensor be insulation-coated. Then, a groove is formed in the boundary between the forward end of the iron tip and the columnar base thereof. Through this groove, a pair of sensor wires extending from a contact point part of the sensor secured to the forward end of the iron tip are introduced to the portion between the outer periphery of the columnar base and the heater cover. The wires are further extended to be pulled out from the portion between the columnar base and the heater cover, and a plug is coupled to the distal ends of the wires.

When controlling the temperature of the iron tip during actual soldering operations by use of this soldering iron constructed as described above, the amount of power supplied to the heater is adjusted by the control means based on the temperature of the iron tip detected by the thermocouple sensor, thereby regulating the iron-tip temperature to the reference temperature set by the user.

The heat-sensitive part of the thermocouple sensor is disposed at or near the forward end of the iron tip, without anything intervening therebetween. With this arrangement, the temperature of the forward end of the iron tip is directly detected while soldering is performed, thus making it possible to correctly detect the actual temperature of the iron tip. Control is then executed based on the thus-detected correct temperature so that the amount of power supplied to the heater can be properly adjusted. Hence, it is possible, not only during idling but actual soldering operations, to correctly regulate the temperature of the iron tip, in particular, the forward end thereof, with good response.

In the manner described above, the foregoing problems inherent in the former type of the conventional soldering iron can be solved by the electric soldering iron of the second conventional technique.

In this electric soldering iron, the sensor wires of the thermocouple sensor whose contact point part is attached to the forward end of the iron tip are insulation-coated, as has been discussed above. This is because of the following assumption. The sensor wires may be brought into contact with each other while passing through the iron tip, resulting in a short circuit therebetween. In such a case, a contact point is newly produced in the short-circuited portion, and information on the temperature of the newly-produced contact point is disadvantageously added to the temperature of the iron tip, which disturbs the detection of the correct temperature of the iron tip. Or, because it is possible that the sensor wires may be brought into contact with the heater cover, the portions of the iron tip other than the forward end, or other elements, a short circuit may also be generated, which inevitably creates a plurality of contact points, thus similarly making it impossible to detect the correct temperature of the iron tip.

Thus, in the electric soldering iron of the second conventional technique, the insulation-coated sensor wires are used for the thermocouple sensor to prevent the above-described possible short circuit, but on the other hand, because of this arrangement, other types of various problems are newly created.

That is, for preventing damage to the insulation coatings deposited on the wires caused by burning or the like, the sensor wires are extended in the rearward direction through the narrow portion between the heater cover and the columnar base of the iron tip, which is at a comparatively low temperature. In order to allow the sensor wires to pass through such a narrow portion, the wires should be made narrow in diameter. This further brings about an easy occurrence of a wire break by an external force, and accordingly, protection means should be provided for the uncovered portion of the wire located at the forward end of the iron tip. Additionally, the distal ends of the sensor wires, which should be made narrow in diameter, cannot be directly inserted into the socket, which is an end portion for receiving a signal representing the temperature of the iron tip, connected to the distal ends of the signal wires extending from the control means. It is thus required that a plug be first coupled to the distal ends of the wires and then connected to the socket.

As a consequence, although the second conventional technique is superior in quality since it employs the thermocouple sensor as a temperature sensor, it somewhat increases the complexity of the construction, which inevitably increases the number of working and assembling processes and also leads to an increase in cost.

SUMMARY OF THE INVENTION

Accordingly, a first object of the present invention is to solve the above-described problems inherent in the electric soldering iron of the second conventional technique, and more specifically, to eliminate the necessity of constructing the sensor wires in a complicated manner, which has been conventionally required for allowing the wires to pass through the iron tip in order to protect the insulation coatings deposited on the wires from burning or the like. This also obviates the need for making the wires small in diameter, which further solves the problem of a wire break and also makes it possible to connect the wires to a jack or the like without requiring the attachment of a plug to the distal ends of the wires. Additionally, without having to take a possible wire break into consideration, protection means for protecting the uncovered portion of the wires is not required.

A second object of the prevent invention is to provide an electric soldering iron which is simply constructed, thereby eliminating the number of working and assembling processes.

In order to achieve the above objects, the present invention provides an assembly of a thermocouple sensor fitted to an iron tip, the sensor detecting a temperature of the iron tip and supplying a signal indicative of the detected temperature to temperature control means which then controls an amount of power supplied to a heater used for heating the iron tip. The thermocouple sensor has a pair of non-covered sensor wires, which provides a heat-sensitive part to be fixed to a nose of the iron tip. The pair of sensor wires are constructed to be received in a hollow portion of a columnar base extending from the rear end of the nose, without application of either an external force to bring the wires into strong contact with each other or to bring the wires into forceful contact with a conductive element including the iron tip. The wires also are constructed to be connectable to an end portion or member which is disposed in the rearward direction of the columnar base so as to receive a signal representing the detected temperature of the iron tip and to supply it to the temperature control means.

In order to enable the above-described construction in which the sensor wires are attached to the iron tip and connected to the temperature control means, the following construction is further provided by way of example.

That is, the pair of sensor wires may be constructed to be laid along the iron tip toward the rear of the nose so as to be received in the hollow portion formed in the columnar base via a lead-in hole opened in the vicinity of the boundary between the nose and the columnar base, and the wires may be further constructed to be inserted into and through a pair of guide holes, respectively, which are formed in a cylindrical insulating support of the heater to be disposed in the hollow portion, the distal ends of the wires being constructed to be connectable to a socket, which is an end portion disposed at the distal ends of the guide holes so as to receive a signal indicative of the detected temperature of the iron tip and supply it to the temperature control means.

In order to construct the structure for fitting a thermocouple sensor to an iron tip in the manner described above, it is not necessary to use special types of temperature control means, heater and other elements, and known elements used for an electric soldering iron of a conventional type may be sufficiently employed. With respect to the heater, however, it is required that a pair of guide holes be formed in the cylindrical insulating support of the heater in such a way that they pass from the forward end to the rear end of the insulating support.

A pair of non-covered sensor wires are employed for the thermocouple sensor, as described above, in which case, the largest possible diameter wires should be suitably used. More specifically, the wires are required to have a diameter of 0.32 mm or greater, and more preferably, 0.45 mm or greater.

Since the structure of the present invention is constructed in the manner described above, an electric soldering iron formed by application of this structure can be used and operated as follows.

It is needless to say that the electric soldering iron obtained by application of this invention carries out soldering by supplying power to the heater which then generates heat and applies it to the iron tip.

During soldering operations, the amount of power supplied to the heater is adjusted by temperature control means, based on the temperature of the nose of the iron tip detected by the thermocouple sensor, thereby regulating the temperature of the tip nose to the reference temperature set by the user.

In this electric soldering iron, the heat-sensitive part of the thermocouple sensor is directly secured to the nose of the iron tip, without anything intervening therebetween. With this arrangement, the temperature of the nose of the iron tip is directly detected while soldering is performed, thus making it possible to correctly detect the actual temperature of the iron tip. Based on the thus-detected correct temperature, the temperature of the heater is suitably adjusted, as has been discussed above. Hence, it is possible, not only during idling but also during actual soldering operations, to correctly regulate the temperature of the nose of the iron tip with good response.

In this soldering iron, although the non-covered sensor wires are employed for the thermocouple sensor, an abnormality does not occur in detecting the temperature of the nose of the iron tip, thereby making it possible to correctly regulate the temperature of the nose of the iron tip with good response.

The foregoing advantages are because of the following reasons. The electric soldering iron by application of this invention is constructed to enable the below-mentioned attachment of the sensor wires to the iron tip and the connection thereof to the control means. A pair of non-covered sensor wires extending from the heat-sensitive part secured to the nose of the iron tip are introduced to the hollow portion in the columnar base extending from the rear end of the nose, without application of either of external force to bring the wires into strong contact with each other or to bring the wires into strong contact with a conductive element, such as the iron tip. Also, the wires are coupled to an end portion, which is disposed in the vicinity of the rear end of the columnar base so as to receive a signal representing the detected temperature of the iron tip and supply it to the temperature control means. With the above-described construction, the sensor wires can be protected from a short circuit therebetween, which would otherwise cause an abnormality in detecting the temperature.

A pair of sensor wires may be brought into light contact with each other while passing through the iron tip. Because of this contact, a short circuit may appear to occur between the wires. Also, a short circuit may seem to occur since the wires may come into contact with a part of the iron tip or other elements. However, if this type of contact occurs with merely a light touch, it does not actually cause an abnormality in detecting the temperature. This idea has been validated by a number of experiments.

This may be because of the following assumption. An electrical resistance of approximately 500 to 1k$\Omega$ or higher can still be maintained between the wires by this degree of light contact. This resistance is further increased by an oxide film thermally produced on the surfaces of the wires.

That the possible contact between the wires does not cause a short circuit may also be because the insulation established by the oxide film produced on the surfaces of the wires is not easily destroyed by a thermally-generated voltage as much as approximately 10 mV, which is usually generated in the thermocouple sensor.

As described above, the electric soldering iron by application of the present invention is constructed to enable the below-mentioned attachment of the sensor wires to the iron tip and the connection thereof to the temperature control means. Without application of either external force to bring a pair of non-covered sensor wires into strong contact with each other or to bring the wires into forceful contact with a conductive element, such as the iron tip, the sensor wires extending from the heat-sensitive part are introduced to the hollow portion formed in the columnar base which extends from the rear end of the nose of the iron tip. Also, the sensor wires are coupled to the end portion, which is disposed in the vicinity of the rear part of the columnar base so as to receive a signal indicative of the detected temperature of the iron tip and supply it to the temperature control means.

The above-described attachment of the sensor wires to the iron tip and the connection thereof to the temperature control means can further be achieved by enabling, for example, the following construction.

That is, the above-described pair of non-covered sensor wires forming the thermocouple sensor whose heat-sensitive part is securely fixed to the nose of the iron tip are laid along the iron tip toward the rear of the nose so as to be introduced to the hollow portion in the columnar base via a lead-in hole opened in the vicinity of the boundary between the nose and the columnar base. Then, the wires are inserted into and through a pair of guide holes, respectively, which are formed in a cylindrical insulating support of the heater to be disposed in the hollow portion, and the distal ends of the wires are coupled to a socket, which is an end portion disposed in the vicinity of the rear ends of the guide holes so as to receive a signal indicative of the detected temperature of the iron tip and supply it to the temperature control means.

With this arrangement, although non-covered sensor wires are employed for the thermocouple sensor, an abnormality does not occur in detecting the temperature of the nose of the iron tip, thereby enabling correct adjustments to the temperature of the iron-tip nose with good response.

Namely, in the above-described electric soldering iron, without application of either of external force to bring a pair of non-covered sensor wires into strong contact with each other or to bring the wires into forceful contact with a conductive element, such as the iron tip, the wires extending from the heat-sensitive part secured to the nose of the iron tip are introduced to the hollow portion of the columnar base through the lead-in hole. Then, the wires are guided toward the rear of the columnar base through guide holes formed in the insulating support of the insulating heater. Further, the wires are coupled to the socket connected to the distal ends of the signal wires extending from the temperature control means. With this construction, a short circuit is not produced between the pair of sensor wires, which would otherwise cause an abnormality in detecting the temperature of the iron tip.

If a pair of sensor wires are brought forcefully into contact with each other or with a part of the iron tip, while passing through the iron tip, a short circuit may outwardly appear to occur between the wires. However, if this type of contact occurs with merely a small force, it does not actually cause an abnormality in detecting the temperature. The reason has already been explained in the above description.

As has been discussed above, the present invention is constructed in such a manner that the thermocouple sensor is formed of non-covered sensor wires, and the wires are not forced to pass through the narrow space, such as the portion between the columnar base of the iron tip and the heater cover, thus making it possible to make the diameter of the sensor wires as large as possible. With this arrangement, it is possible overcome the drawback of an easy occurrence of a wire break inherent in the second conventional technique, which further eliminates the necessity of providing protection means for protecting the sensor wires from a wire break.

Additionally, the strength of the sensor wires is increased due to the larger diameter thereof. Accordingly, without requiring the attachment of a plug to the distal ends of the wires, they can be directly coupled to the socket, which is an end portion for receiving a signal representing the detected temperature of the iron tip to supply it to the temperature control means. This decreases the number of assembling processes and also eliminates the need for a plug, which further leads to a reduction in cost.

DESCRIPTION OF THE PREFERRED EMBODIMENTS

Figure 1:
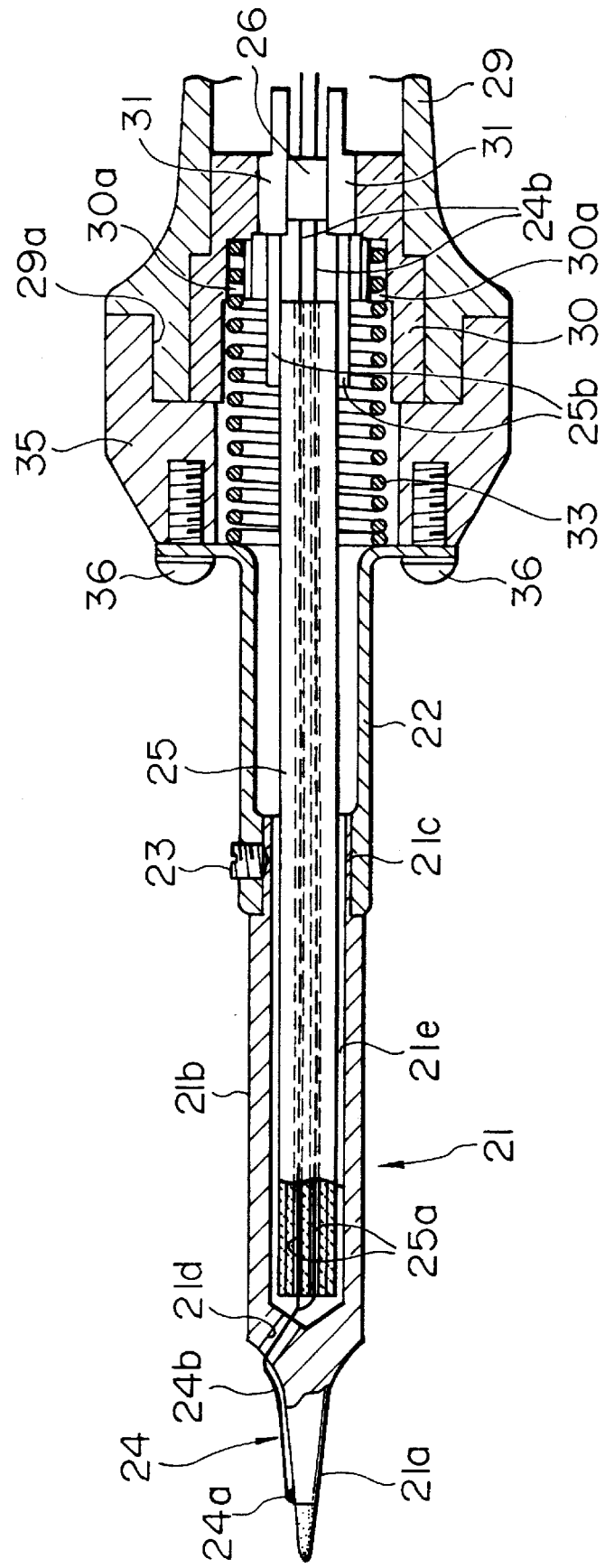
FIG. 1 is a cross sectional view, partially broken away, illustrative of the forward portion from a grip of an electric soldering iron of an embodiment formed by application of the present invention.
Figure 2:
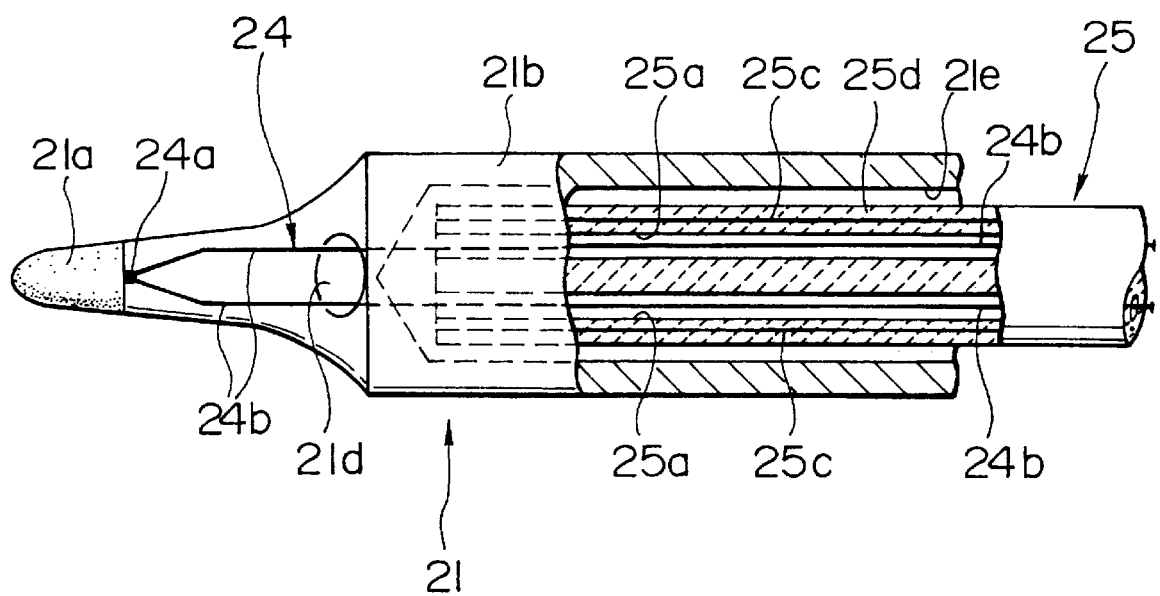
FIG. 2 is a front view, partially broken away, illustrative of and around the forward portion of the iron tip of the electric soldering iron of an embodiment formed by application of the present invention.
Figure 3:
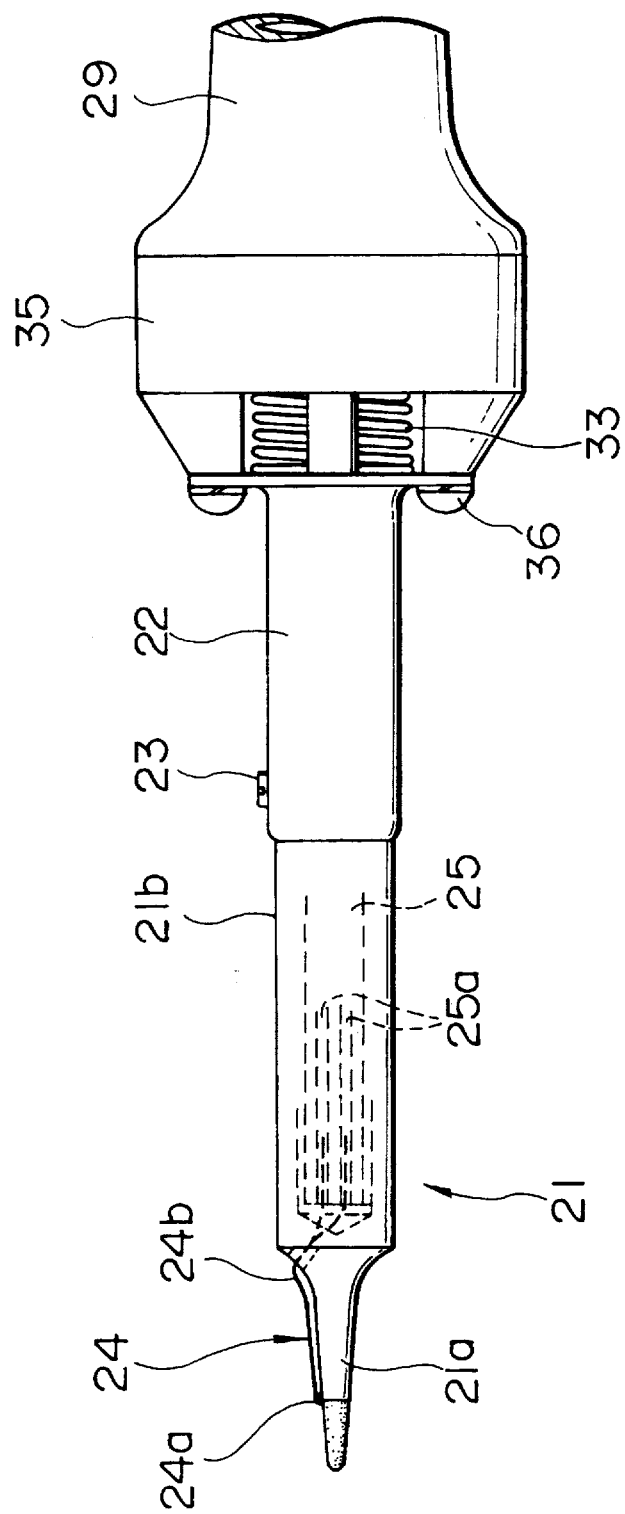
FIG. 3 is a side view illustrative of the forward portion of the electric soldering iron of an embodiment formed by application of the present invention.

An embodiment of the present invention will now be described in detail with reference to the drawings.

Although the present invention will be described in the form of the following preferred embodiment which is limited by various technically preferable restrictions, it is not intended to limit the scope of the invention by any of these preferred modes, unless otherwise specified in the following description.

As shown in FIGS. 1–4, the electric soldering iron is provided with an iron tip 21 at the forward end thereof. The iron tip 21 has a generally-tapered nose 21a at its forward end portion and a columnar base 21b at its base end portion. Further, the outer periphery of the base 21b is removed to form a smaller-diameter joint tubular portion 21c at the rear of the base 21b. The joint tubular portion 21c can be securely screwed to a generally-cylindrical tip holder 22 by the following process. The joint tubular portion 21c is first detachably inserted into an opening at the forward end of the tip holder 22, and a tip-setting screw 23 is inserted from the outer periphery of the tip holder 22 so that the forward end of the tip holder 22 can be pressed against the outer periphery of the joint tubular portion 21c. Accordingly, when the screw 23 is loosened, the joint tubular portion 21c can easily be removed from the tip holder 22.

Further, as illustrated in FIGS. 1–4, a contact point part 24a, which is a heat-sensitive part of a non-covered thermocouple sensor 24, is secured to the nose 21a of the iron tip 21. As particularly shown in FIG. 2, non-covered sensor wires 24b, 24b extending from the contact point part 24a are further laid on the outer surface of the tip nose 21a toward the columnar base 21b in such a way that they are slightly separated from each other. Also, as illustrated in FIG. 1, the sensor wires 24b, 24b are introduced into a hollow portion 21e within the columnar base 21b through a lead-in groove 21d which is opened in the boundary between the tip nose 21a and the base 21b. The wires 24b, 24b further pass into and through guide holes 25a, 25a which are longitudinally formed in the vicinity of the center of an insulating support 25d of a heater 25 which is to be inserted into the hollow portion 21e. The distal ends of the sensor wires 24b, 24b projecting from the rear end of the insulating support 25b of the heater 25 are in the state of being coupled to a socket 26. The socket 26 is connected to a signal processor 28 of a temperature controller 27 via signal wires.

Figure 4:
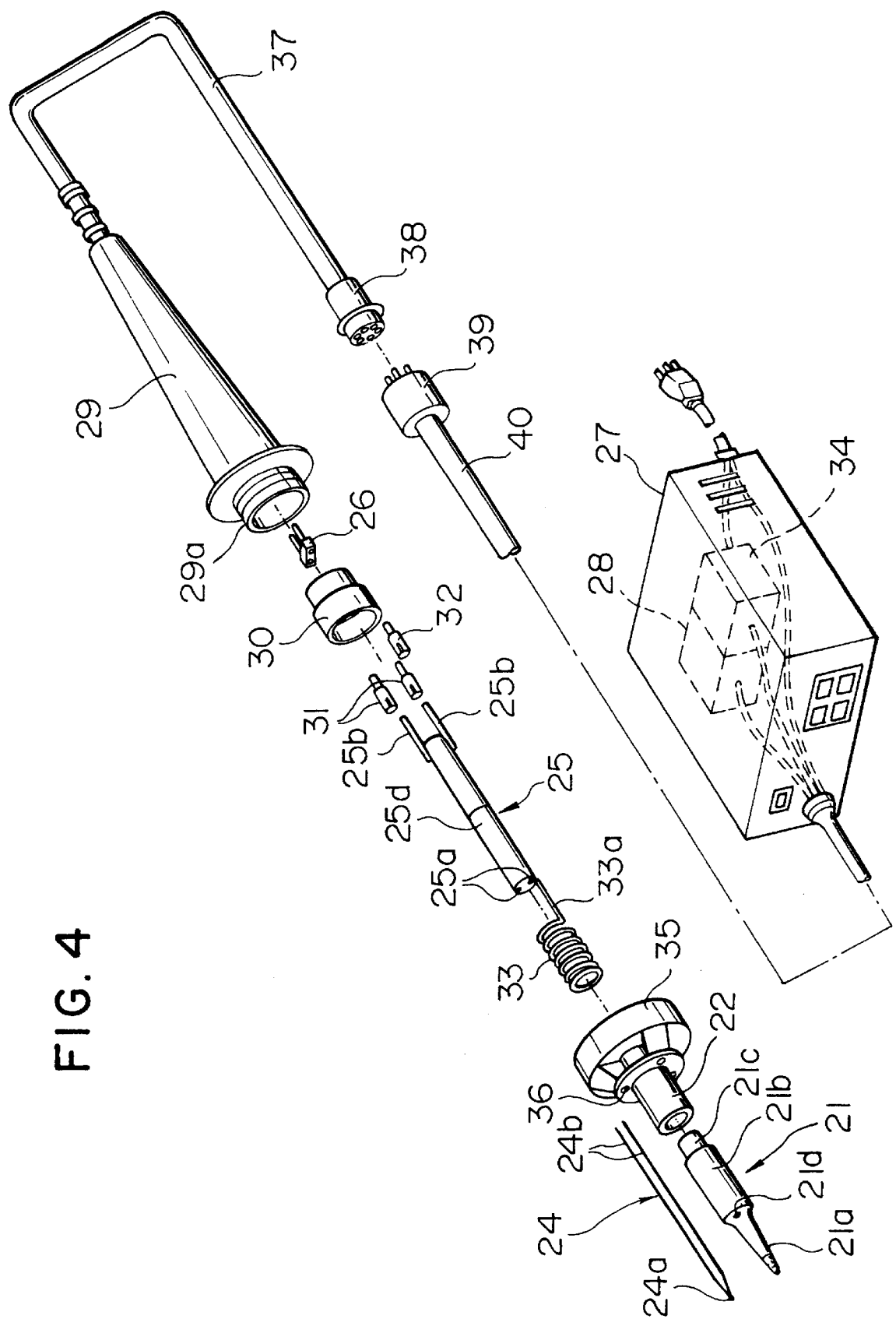
FIG. 4 is an exploded perspective view illustrative of the electric soldering iron of an embodiment formed by application of the present invention.

As shown in FIGS. 1 and 4, a coupling connector 30 is inserted into the opening at the forward end of a grip 29, and the socket 26 is fixed in the center of the rear portion of the coupling connector 30. Moreover, electric power contact pins 31, 31 are provided in predetermined positions of the outer peripheral portion of the socket 26, and a ground contact pin 32 is also provided in a farther outward predetermined position than the contact pins 31, 31.

As illustrated in FIGS. 1 and 4, the forward ends of electrodes 25b, 25b of the heater 25 are inserted into the electric power contact pins 31, 31 so that they can be electrically connected and mechanically supported to/by the pins 31, 31.

As shown in FIG. 1, the coupling connector 30 is provided with a groove 30a formed in a ring-like shape in a position corresponding to the ground contact pin 32 so as to receive a ground spring 33. This groove 30a thus serves to receive one end of the ground spring 33 and also to allow a lead wire 33a of the end of the spring 33 to be inserted into the contact pin 32 so as to establish an electrical connection therebetween.

The rear ends of the power contact pins 31, 31 are connected to a power supply 34 of the temperature controller 27 via power lines, and the ground contact pin 32 is connected to the ground of the temperature controller 27 via a ground line.

As shown in FIGS. 1 and 4, a male thread 29a projects from the forward end of the grip 29, and a heat radiating nut 35 is detachably fit around the male thread 29a. The tip holder 22 is further fixed to the forward end of the radiating nut 35 via a flange portion at the rear end of the holder 22 and via screws 36, 36 . . . used for securing the flange portion to the radiating nut 35. With this construction, since the forward end of the ground spring 33 is held by the flange portion of the tip holder 22, the coupling connector 30 is pressed toward the rear via the spring 33 so that it can be fixed within the forward portion of the grip 29.

The above-described heater 25 is constructed in such a manner that a heat-emitting portion 25c is held by the cylindrical insulting support 25d formed of a ceramic material and is provided for only a part near the outer periphery of the front half of the heater 25. It is needless to say that the heat-emitting portion 25c is electrically connected to the two electrodes 25b, 25b provided at the rear end of the insulating support 25d.

As has been discussed above, a pair of guide holes 25a, 25a are longitudinally formed in the vicinity of the center of the cylindrical insulating support 25d of the heater 25 so as to allow the non-covered sensor wires 24b, 24b of the thermocouple sensor 24 to pass into and through the holes 25a, 25a from the forward end to the rear end. The socket 26 is fixed in the rear of the rear ends of the guide holes 25a, 25a while being located by the coupling connector 30. Further, the distal ends of the sensor wires 24b, 24b passing through the holes 25a, 25a are guided into connecting holes of the socket 26.

Since the above-described thermocouple sensor 24 is formed of non-covered wires, and since the wires are not forced to pass through a narrow space, it is possible to enlarge the diameter of the sensor wires 24b, 24b as needed, 0.5 mm-diameter wire rods being used in this embodiment. The sensor wires 24b, 24b thus have a sufficient strength and are not easily bent with a small force, and accordingly, they can be inserted into the socket 26 without requiring the connection of a plug to the distal ends of the wires 24b, 24b.

The temperature controller 27 used in this embodiment is a typical apparatus which compares the temperature of the iron tip 21 detected by the thermocouple sensor 24 with the reference temperature set by the user and then makes adjustments to the amount of power supplied to the heater 25, thereby controlling the temperature of the iron tip 21 to match the reference temperature.

In FIG. 4, reference numeral 37 denotes a cable formed by integrating the above-described signal wires, power wires and the ground wire. 38 indicates a female connector; 39 designates a male connector provided for the temperature controller 27; and 40 represents a cable.

The electric soldering iron of this embodiment constructed as described above, as well as typical soldering irons of this type, supplies power to the heater 25 from the power supply 34 of the temperature controller 27 via the power lines so as to allow the heater 25 to emit heat and apply it to the iron tip 21, thereby performing a soldering operation.

In this electric soldering iron, the contact point part 24a, which is a heat-sensitive part, of the thermocouple sensor 24 is secured to the nose 21a of the iron tip 21 so as to detect the temperature of the nose 21a of the iron tip 21. The thus-detected temperature information in the form of an electric signal is transmitted to the signal processor 28 of the temperature controller 27 via the sensor wires 24b, 24b and the signal wires connected thereto. The temperature controller 27 executes the following process to control the nose 21a of the iron tip 21 to reach the reference temperature. Upon processing being executed by the signal processor 28, the amount of power is determined in the power supply 34 so as to be supplied via the power lines to the heater 25 in which an appropriate heating action is performed so that the nose 21a of the iron tip 21 can reach the reference temperature.

It is needless to say that signal processing executed by the signal processor 28 is performed based on the information on the detected temperature of the nose 21a of the iron tip 21, which information can be received in real time, and also based on the reference temperature set by the user.

In performing an actual soldering operation by use of this electric soldering iron, the iron tip 21, in particular, the nose 21a, as well as those elements of the other types of electric soldering irons, may be cooled by solder or parts to be soldered, such as electric parts.

In this embodiment, as described above, the contact point part 24a used as a heat-sensitive part of the thermocouple sensor 24 is attached to the nose 21a of the iron tip 21 so that the temperature of the nose 21a of the iron tip 21 can be directly detected. With this arrangement, the temperature of the nose 21a of the iron tip 21 can be detected without producing a time lag and be transmitted to the signal processor 28 of the temperature controller 27. The temperature is then compared with the reference temperature in the signal processor 28 and, upon this comparison, the amount of power supplied to the heater 25 can be determined in the power supply 34. With this arrangement, the temperature of the nose 21a of the iron tip 21 can be regulated without delay.

As a result, correct adjustments can be made to the temperature of the nose 21a of the iron tip 21 in real time, which further enables correct adjustments of the exact soldering temperatures required for performing soldering operations for precision electric parts.

On the other hand, the non-covered sensor wires 24b, 24b are used as wires for the thermocouple sensor 24 of the electric soldering iron of this embodiment. However, the wires 24b, 24b of this type do not cause any abnormality in the detection of the temperature of the nose 21a of the iron tip 21, and it is still possible to correctly adjust the temperature of the nose 21a of the iron tip 21 with good response.

That is, this seeming contradiction arises from the fact that even though the sensor wires 24b, 24b are non-covered, a short circuit does not occur between the wires 24b, 24b, which otherwise would cause an abnormality in detecting the temperature.

More specifically, the sensor wires 24b, 24b in some cases may be brought into contact with each other while passing through the iron tip 21. Because of this contact, a short circuit may appear to occur between the wires 24b, 24b. Also, a short circuit may seem to occur between the wires 24b, 24b since the wires may come into contact with a part of the iron tip 21 while passing through the iron tip 21. However, this type of contact occurs with merely a light touch, that is, a great force does not particularly act upon the wires 24b, 24b when they are brought into contact with each other or with a part of the iron tip 21. Thus, this does not bring about a short circuit to such a degree as to cause an abnormality in detecting the temperature.

Further, this may be because of the following reason. An electrical resistance of approximately 500 to 1kΩ or higher can be still maintained between the wires 24b, 24b by this degree of light contact. This resistance is further increased by an oxide film thermally produced on the surfaces of the wires 24b, 24b.

That the contact between the wires 24b, 24b does not cause a short circuit may also be because the insulation established by the oxide film produced on the surfaces of the wires 24b, 24b is not easily destroyed by a thermally-generated voltage as much as approximately 10 mV, which is usually generated in the thermocouple sensor 24.

As in the manner described above, the electric soldering iron of this embodiment is constructed as follows. The contact point part 24a, which is a heat-sensitive part of the thermocouple sensor 24, is securely attached to the nose 21a of the iron tip 21. A pair of non-covered sensor wires 24b, 24b are laid and extended on the surface of the nose 21a from the contact point part 24a while being slightly separated from each other so as to be introduced into the hollow portion 21e of the columnar base 21b via the lead-in hole 21d which is opened in the vicinity of the boundary between the nose 21a and the base 21b. The wires 24b, 24b are further allowed to be inserted into and through the guide holes 25a, 25a, respectively, and the distal ends of the wires 24b, 24b projecting from the rear ends of the holes 25a, 25a are inserted into the connecting holes of the socket 26.

With the above-described construction, the sensor wires 24b, 24b are not usually brought into contact with each other with a great force, and also, they are protected from forcefully coming into contact with any part of the iron tip 21. If a particular operation is performed, for example, if the sensor wires 24b, 24b are simultaneously pressed against the tip of a flat-blade screwdriver with a great force, an abnormality in detecting the temperature may be caused, which extreme case will be described hereinafter. However, it is very unlikely that an accident similar to this will occur during actual soldering operations. It can thus be concluded that the sensor wires 24b, 24b can be usually protected from the occurrence of a short circuit therebetween while passing through the guide holes 25a, 25a of the heater 25, thus allowing the thermocouple sensor 24 to continue to detect the correct temperatures.

Figure 5:
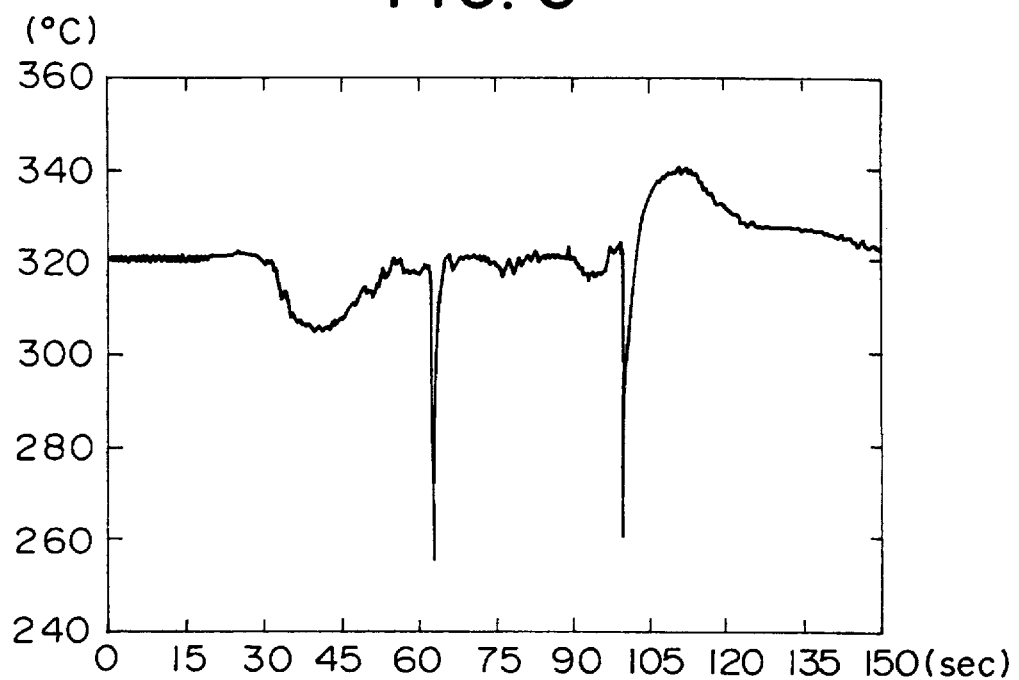
FIG. 5 is a diagram showing a change in the temperature of the nose of the iron tip when an actual soldering operation is performed to solder a ¼ carbon resistor to a glass epoxy resin substrate by use of the electric soldering iron of an embodiment formed by application of the present invention.

FIG. 5 is a diagram showing a change in the temperature of the nose of the iron tip when a soldering operation is performed to solder a ¼ W carbon resistor to a glass epoxy resin substrate by use of the electric soldering iron of this embodiment under the following conditions. The power capacity of the heater 25 used in the electric soldering iron is 40 W, and the reference temperature which is targeted in this soldering operation is 320° C. This operation is performed manually by the user.

Figure 6:
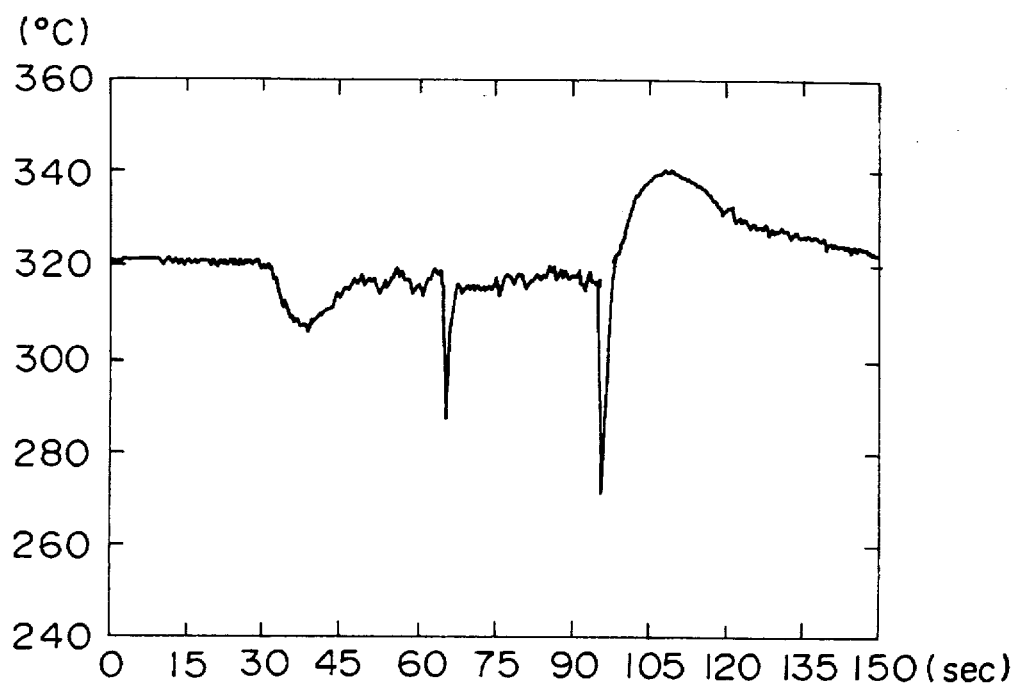
FIG. 6 is a diagram showing a change in the temperature of the nose of the iron tip when an actual soldering operation is carried out to solder a ¼ carbon resistor to a glass epoxy resin substrate by use of the electric soldering iron formed by application of the second conventional technique which is given for comparison with the present invention.
Figure 7:
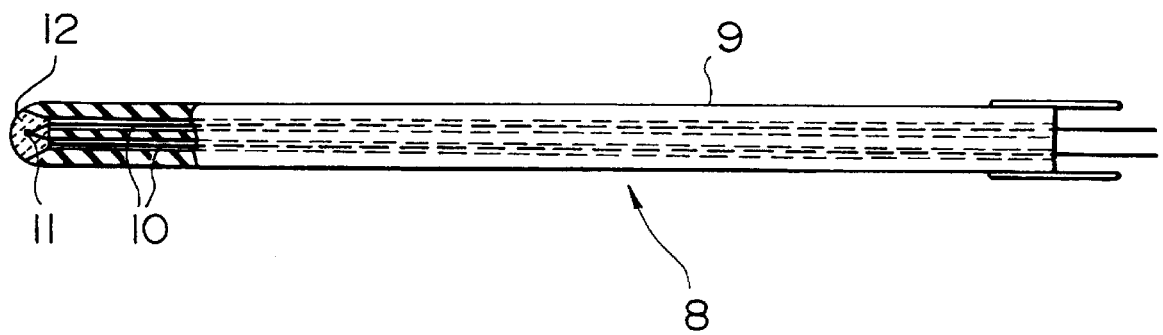
FIG. 7 is a side view, partially broken away, illustrative of a heater used in a conventional electric soldering iron.
Figure 8:
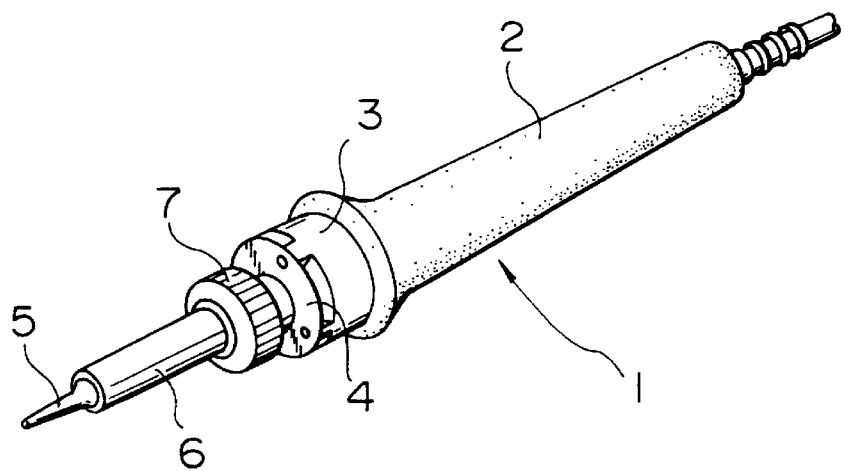
FIG. 8 is a perspective view, partially broken away, illustrative of a conventional electric soldering iron.

FIG. 6 is a diagram given for comparison with FIG. 5, and shows a change in the temperature of the nose of the iron tip when a soldering operation is performed to solder. a ¼ W carbon resistor to a glass epoxy resin substrate under the following conditions by use of an electric soldering iron which is formed by application of the above-described second conventional technique. The power capacity of the heater used in the soldering operation is also 40 W, and the reference temperature which is targeted in this operation is also 320° C. This operation is performed manually by the user.

The iron tip of the latter soldering iron (the one which is formed by application of the invention of the second conventional technique) is formed in nearly the same shape as that of the embodiment of this invention, both iron tips being equal in diameter and length, although they cannot be exactly identical, for example, the iron tip of the latter soldering iron is not provided with a hole equivalent to the lead-in hole 21d provided for the soldering iron of the embodiment.

As shown in FIGS. 5 and 6, a sharp decrease in the temperature for an instant can be detected between 60 and 75 seconds and between 90 and 105 seconds. This is because the iron tips of both the soldering irons were cleaned with a water-soaked sponge.

FIGS. 5 and 6 indicate that no substantial difference can be detected between a change in the temperature of the nose of the iron tip according to the present invention and that of the second conventional technique. This verifies that the use of the non-covered sensor wires 24b, 24b as the thermocouple sensor 24 does not cause an abnormality in detecting the temperature.

In the electric soldering iron of this embodiment, if an extreme operation is carried out, for example, if the portions of the sensor wires 24b, 24b which are laid on the rear part of the nose 21a of the iron tip 21 are simultaneously pressed against the forward end of a flat-blade screwdriver, a sharp temperature drop by approximately 100° C. is detectable. This symptom may arise from the fact that a short circuit has been produced at the portions of the sensor wires 24b, 24b which are pressed against the flat-blade screwdriver, and the information on the temperature of the short-circuited portions is disadvantageously transmitted. The amount of decrease in the temperature varies depending on the part to be forcefully pressed against the flat-blade screwdriver. It is certain that the abnormality in detecting the temperature can be immediately eliminated by quitting the above-described pressing operation with the screwdriver.

Conversely, it can be understood that the constant operation of detecting the correct temperatures can be ensured unless any extreme action, such as simultaneously pressing the sensor wires 24b, 24b with the forward end of the flat-blade screwdriver, is performed. In fact, however, it is very unlikely that such an extreme action will be made during actual soldering operations. It can thus be confirmed that an abnormality hardly occurs in detecting the temperature during the usual soldering operation.

In the electric soldering iron of this embodiment, the thermocouple sensor 24 is formed of the non-covered sensor wires 24b, 24b which are not forced to pass through a narrow space, such as a groove formed between the columnar base of the iron tip 21 and the heater cover. With this construction, the sensor wires 24b, 24b can be formed of a larger diameter, and accordingly, the 0.5 mm-diameter sensor wires 24b, 24b are used in this embodiment, as has been discussed above.

The sensor wires 24b, 24b, in particular, the portions exposed to the exterior from the nose 21a of the iron tip 21, are likely to be brought into contact with solder or parts to be soldered during soldering operations or other occasions. However, even if they come into contact, there is very little possibility of producing a wire break because of the thus-formed larger wires. This eliminates the necessity of providing protection means or the like for preventing a break of the sensor wires, which are generally necessitated for the wires of the thermocouple sensor used in the electric soldering iron of the second conventional technique.

Also, as described above, since the diameter of the sensor wires 24b, 24b of the thermocouple sensor 24 is made as large as 0.5 mm, the strength of the wires themselves is increased. Given this advantage, the sensor wires 24b, 24b can be directly connected, without requiring the attachment of a plug to the distal ends of the wires, to the socket 26, which is an end portion for receiving a signal indicative of the temperature of the iron tip to supply it to the temperature controller 27. This further decreases the number of assembling processes and eliminates the need for a plug, which gives rise to a reduction in cost.

For the replacement of the worn iron tip 21 with a new one, it is essential only that the tip-setting screw 23 is first loosened from the tip holder 22 so as to detach only the iron tip 21 together with the thermocouple sensor 24 secured thereto, and then, a new iron tip 21 which is also provided with a thermocouple sensor 24 is coupled to the tip holder 22 while the sensor wires 24b, 24b of the thermocouple sensor 24 are inserted into the guide holes 25a, 25a. In this manner, the replacement operation of the iron tips can be extremely simplified. In other words, since the sensor wires 24b, 24b possess a sufficient strength, they can be merely inserted into the guide holes 25a, 25a of the heater 25 so that they can be guided into the socket 26 and properly coupled thereto.

In contrast, for the replacement of iron tips of the electric soldering iron according to the second conventional technique, it is necessary that the cover nut be first detached to remove the worn iron tip and the thermocouple sensor attached to the tip, and then, the heat-radiating nut be detached in order that a plug connected to the distal end of the thermocouple sensor of a new iron tip can be coupled to the socket connected to the distal ends of the signal wires of the temperature controller. It is obvious that the replacement operation necessitated by the present invention is much simpler than that by the second conventional technique.

As will be clearly understood from the foregoing description, the present invention offers the following advantages.

The temperature of the iron tip of the electric soldering iron is directly detected by the thermocouple sensor so as to regulate the temperature of the heater, thereby achieving correct adjustments to the temperature of the iron tip with good response even during actual soldering operations. Additionally, even though the thermocouple sensor is formed of non-covered sensor wires, it is constructed such that an external force does not act upon the wires, thus inhibiting an easy occurrence of a short circuit between the wires and preventing the generation of an abnormality in detecting the temperatures.

Since the thermocouple sensor is formed of non-covered sensor wires, and since the wires are not forced to pass through a narrow space, the wires can be enlarged in diameter, thus inhibiting an easy occurrence of a wire break. This further obviates the necessity of protecting the thermocouple sensor from a wire break. Also, even though the sensor wires are brought into contact with the surrounding parts or the parts to be soldered, they can be prevented from being damaged even without being provided with protection means. With this advantage, the user is able to carry out a soldering operation without concern for damage to the wires. As a consequence, there can be an improvement in the workability of soldering.

Moreover, the sensor wires of the thermocouple sensor possess increased strength because of the larger diameter thereof. Accordingly, the wires can be directly coupled, without requiring the attachment of a plug or the like to the distal ends of the wires, to a connector such as a socket or the like, which is an end portion for receiving a signal indicative of the temperature of the iron tip to supply it to the temperature controlling means. The plug or the like is not required so that the number of assembling processes can be decreased and a reduction in cost can be also achieved.

Further, for the replacement of the worn iron tip with a new one used in the soldering iron constructed as described in the foregoing embodiment, it is essential merely that only the iron tip together with the thermocouple sensor attached thereto be detached from the tip holder, and then, a new iron tip which is also provided with a thermocouple sensor is attached to the tip holder while the sensor wires of the thermocouple sensor are inserted into the guide holes of the heater. In this manner, the replacement operation is extremely simplified. In other words, since the sensor wires have a sufficient strength, they can be simply inserted into the guide holes of the heater so that they can be guided into the socket, and the distal ends thereof can be properly coupled to the socket.

What is claimed is:

1. An assembly comprising:
    an iron tip including a nose having a forward end and a rearward end and a columnar base extending from said rearward end, said columnar base having a hollow interior; and
    a thermocouple sensor operable to detect a temperature of said nose, said sensor including a contact point mounted on an outer surface of said nose adjacent said forward end thereof and a pair of uncovered sensor wires connected to said contact point and extending rearwardly therefrom along said outer surface of said nose, said pair of wires extending into said hollow interior of said columnar base without being forced into strong contact with each other and without being brought into forceful contact with a conductive element including said iron tip.

2. An assembly as claimed in claim 1, wherein each said uncovered sensor wire has a diameter of at least 0.32 mm.

3. An assembly as claimed in claim 2, wherein said diameter is at least 0.45 mm.

4. An assembly as claimed in claim 3, wherein said diameter is 0.5 mm.

5. An assembly as claimed in claim 1, wherein said iron tip has therein, adjacent a boundary between said nose and said columnar base, a hole extending into said hollow interior of said columnar base, and said sensor wires extend through said hole.

6. An assembly as claimed in claim 5, further comprising a heater including a cylindrical insulating member disposed within said hollow interior of said columnar base, said sensor wires extending through respective guide holes formed in said insulating member.

7. An assembly as claimed in claim 6, wherein distal ends of said sensor wires are connected to a member mounted rearwardly of said columnar base to supply thereto an electrical signal representative of the temperature detected by said sensor.

8. An assembly as claimed in claim 7, wherein said member comprises a socket, and said distal ends of said wires are inserted directly into said socket.

9. An assembly as claimed in claim 7, further comprising a temperature control means connected to said member and to said heater and operable to control an amount of power supplied to said heater to control the temperature of said nose of said iron tip in response to said signal received from said member.

10. An assembly as claimed in claim 7, wherein said member is positioned rearwardly of a rear end of said insulating member.

11. An assembly as claimed in claim 1, wherein said contact point is uncovered.

* * * * *